F. C. HALLER.
APPARATUS FOR BAKING BREAD.
APPLICATION FILED JUNE 10, 1920.
1,363,781.
Patented Dec. 28, 1920.
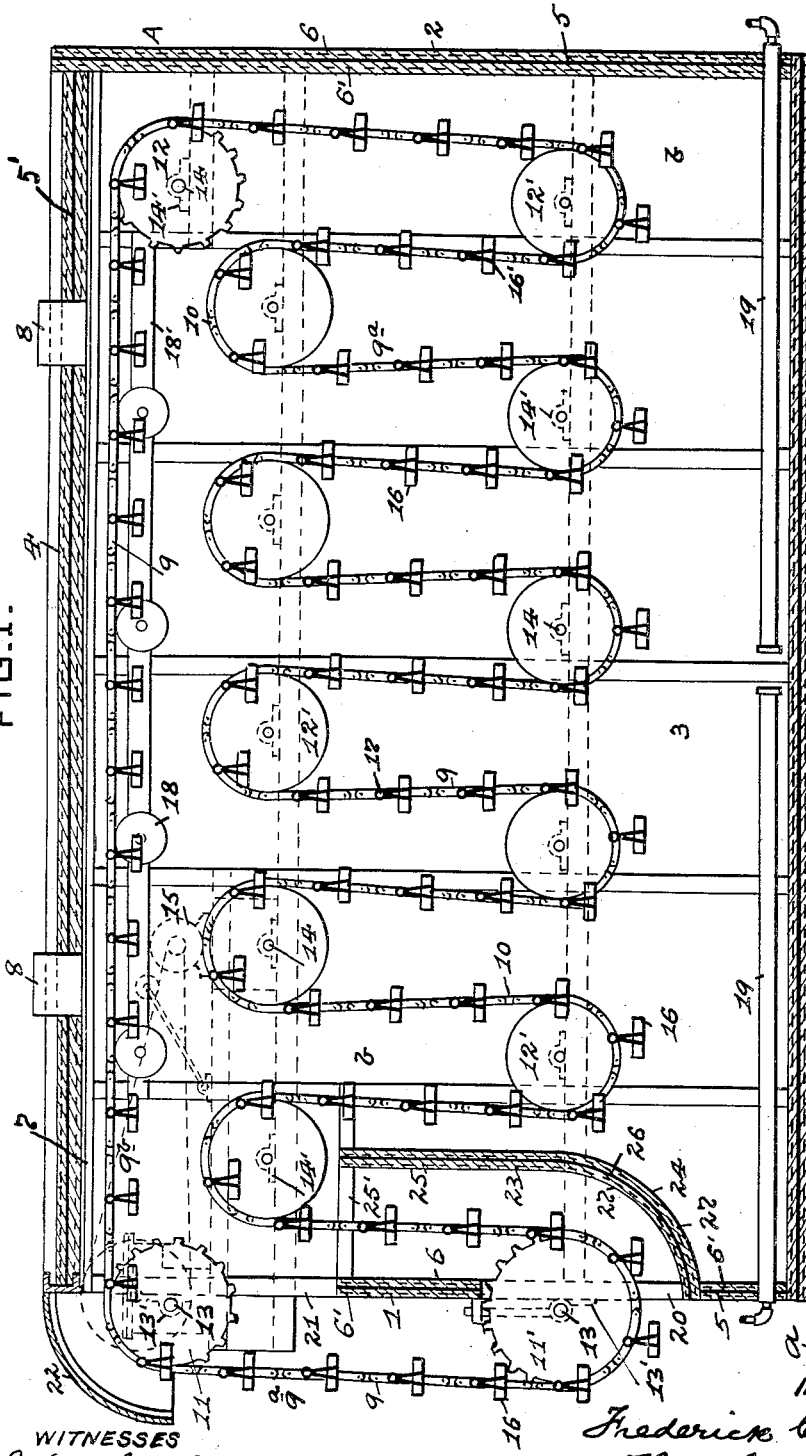
INVENTOR
Frederick C. Haller,
By J. N. Cooke,
attorney.
WITNESSES
J. H. Val Bradley.
J. M. Geoghegan.

UNITED STATES PATENT OFFICE.

FREDERICK C. HALLER, OF PITTSBURGH, PENNSYLVANIA.

APPARATUS FOR BAKING BREAD.

1,363,781. Specification of Letters Patent. Patented Dec. 28, 1920.

Application filed June 10, 1920. Serial No. 387,973.

*To all whom it may concern:*

Be it known that I, FREDERICK C. HALLER, a citizen of the United States, and a resident of Pittsburgh, in the county of Allegheny and State of Pennsylvania, have invented a new and useful Improvement in Apparatus for Baking Bread; and I do hereby declare the following to be a full, clear, and exact description thereof.

My invention relates to bakers' ovens, and has special reference to such ovens for use in the baking of bread and other like articles of the type shown in my co-pending application Serial No. 315,151, filed August 4, 1919.

The object of my invention is to provide a cheap, simple and efficient form of an oven for the baking of bread, and in which the bread will be baked rapidly, thoroughly and uniformly, and will provide an oven which will occupy a smaller space than the ordinary approved ovens and also have a greater capacity.

To these ends my invention consists, generally stated, in the novel arrangement, construction and combination of parts, as hereinafter more specifically set forth and described and particularly pointed out in the claims.

To enable others skilled in the art to which my invention appertains to construct and use my improved oven, I will describe the same more fully, referring to the accompanying drawings, in which—

Figure 1 shows a vertical section of my improved oven; Fig. 2 is an elevation of the top of the front end of the oven; Fig. 3 is an enlarged section of the oven showing the wall construction; and Fig. 4 is a detail view showing a portion of the shelf or tray employed.

Like symbols of reference herein indicate like parts in each of the figures of the drawings.

As illustrated in the drawings A represents my improved oven, which is arranged to be set upon the usual floor $a$ of the bakery, and is provided with the front wall 1, rear wall 2, side walls 3, and top wall 4 to form the baking or heating chamber $b$ between the same. These walls may be formed from metal sheets or plates, which are connected together in any suitable manner, with such front wall 1, rear wall 2 and side walls 3 being composed of sheet metal plates 5 coated on the inside and outside with a composition 6 containing asbestos or other heat resisting and non-conducting material, which is reinforced by expanded metal lath 6' embedded therein. The top wall 4 is formed of a single plate 5' which is supported on angle bars 7 extending within the oven. The bottom is similarly formed. The top and bottom are also preferably insulated in the same way as the sides. Thus the interior of the oven is lined as well as the outside. It has been found that the saving of fuel derived from such an arrangement and construction is considerable, while the weight permits it to be placed anywhere without requiring a special foundation. Extending through the top wall 4 and covering are the two exit or waste flues 8 which lead from the chamber $b$ and if desired can be connected to any suitable chimney or stack.

Mounted within the baking chamber $b$ and having a portion thereof extending outside of the chamber and beyond the front wall 1, is a conveyer 9, which is formed of two continuous chains 10, each of which is adapted to pass over and around the front upper and lower sprocket wheels 11 and 11' and upper rear sprocket wheels 12, and over and around the sheaves 12' within the baking chamber. The front sprocket wheels 11 and 11' are mounted on shafts 13 which are journaled in bearings 13' supported on the outer surface of the front wall 1 of the oven A and the sprocket wheels 12 and sheaves 12' are mounted on shafts 14 which are journaled in bearings 14' supported within the bearing chamber $b$. The lower series of wheels or sheaves 12' are preferably of less diameter than those of the upper series in order to effect a substantial conservation of space, and they are so arranged that the upwardly and downwardly extending portions of the conveyer are at a slight angle instead of being vertical. Power for operating the conveyer 9 is applied to the upper front shaft 13 from a suitable motor 15 shown by dotted lines in Fig. 1, and connected to the shaft by a suitable pulley and reduction gearing indicated at 15'. On the opposite end of the shaft 13 is provided a ratchet wheel 13ª. Mounted to rotate on the shaft 13 but independently of the rotation of the said shaft is a handle 13ᵇ carrying a pawl 13ᶜ for engagement with the ratchet. By means of the pawl and ratchet arrangement, it is possible to rotate the shaft 13 manually in the event of failure of the power driving means to operate, and the bread in the heated oven may thus be prevented from burning. It may also be of use in starting the conveyer.

The chains 10 are provided with a number of shelves or trays 16, which extend across between such chains and are placed continuously around and spaced apart on the chains. These trays 16 are pivoted to rods 17 by means of the hangers 16' and such rods extend between the chains 10, and thereby are arranged to always maintain a horizontal position when the chains are placed for operating, except when it is desired to tilt such trays, as hereinafter described.

The sprocket wheels 11, 11' and 12 and sheaves 12' are so arranged or positioned that the chains 10 carrying the trays 16 for forming the conveyer 9 will travel over such wheels and sheaves in substantially up and down movement, as shown by the portions 9$^a$ on the conveyer within and in front of the oven A, except that a portion of such conveyer will travel in a horizontal movement, as shown by the portion 9$^b$, when the conveyer has traveled through the chamber $b$ and has left the upper rear wheels 12 to assume such position until it assumes the front and outer vertical portion 9$^a$ in passing over the wheels 11 and 11'. The horizontal portions 9$^b$ of the chains 10 pass over the idler sprockets 18 journaled in a bearing bar 18' at the upper end of the baking chamber $b$ and supported on each side of the same.

Within the lower part of the baking chamber $b$ are the burner pipes 19 for supplying heat to said chamber and to which any suitable fuel, such as natural gas, can be applied and controlled in the usual manner.

An opening 20 is formed in the lower portion of the front wall 1 of the oven A for the lower front wheel 11' and also for the chains 10 and trays 16 in passing through the same into the baking chamber $b$. An opening 21 is also formed in the upper portion of the front wall 1 for the upper front wheel 11 and also for the chains 10 and trays 16 in emerging from the baking chamber $b$. Above said opening is the vapor hood 22.

Within the baking chamber $b$ and between the two front portions 9$^a$ on the conveyer 9 therein is the baffle plate or wall 23, which extends from the lower end or bottom of the opening 20 by a curved portion 24 connecting with the vertical portion 25 extending up between said portions 9$^a$, and such baffle wall is supported within such chamber in any suitable manner, such as at its lower end within said opening and its upper end to a bar 25' extending along the side walls 3 of said chamber. The baffle wall 23 can be formed in any suitable manner such as by a central plate 26 having a covering or lining 27 on each side thereof, which can be formed of suitable refractory material, such as asbestos, magnesia, or other suitable composition. This baffle wall acts to isolate the first ascending filled trays 16 from the full oven heat and from the outside air entering the opening 20, as will be hereinafter described. The baffle further serves to prevent the heat of the oven "flashing" out, thereby protecting the workmen.

The use and operation of my improved baking oven A is as follows: The bread or other articles to be baked are placed upon the trays 16 as such trays descend with the chains 10 along in front of the oven A, as indicated by the arrow, and where such trays are filled. As fast as the trays 16 are filled on the front exterior portion 9$^a$ of the conveyer 9, as above described, they pass through the opening 20 in the front wall 1 into the baking chamber $b$, and then above the burners 19 along through said chamber and over the sheaves 12' and wheels 12 therein substantially in an up and down vertical movement. During such movement of the bread filled trays 16 in the baking chamber $b$ the bread is being baked by the heat from the burners 19, and when the filled trays have reached and passed around the lower rear sheave 12', they will then pass up and over the upper rear sprocket wheels 12, and then along the upper part of the chamber $b$ in substantially a horizontal line to and over the upper front wheel 11, thereby completing the baking process of the bread on such trays. The baked bread on the trays 16 will then pass down along the front of the oven A where it is removed and the unbaked dough placed on such trays for continuing the baking process.

It will be evident that by arranging the chains carrying the trays for the bread in an inclined position in the baking chamber, as shown in Fig. 1, they will conserve space and that the difference in the size of the wheels of the upper and lower series will allow for considerable additional conservation of space for the same length of chain and yet keep the adjacent upwardly and downwardly extending portions of the conveyer properly spaced so that the trays will not interfere with each other. Obviously the device can be used for the baking of articles other than bread, while various other modifications and changes in the design and construction of my improved oven may be resorted to, without departing from the spirit of the invention or sacrificing any of its advantages.

It will thus be seen that in the use of my improved oven, the baffle wall will allow the loaf of bread to strike only a moderate heat as the loaf enters the oven and for several minutes it is gradually entering into the normal heat of the baking chamber, during which period it has an opportunity to expand before it is sealed with the crust, thereby giving the desired qualities in a commercial loaf of bread, such as being thoroughly aerated, lighter, greater in volume and more digestible. And further, due to such graduation of heat, the bread so baked in such oven has a crust considerably thinner and more tender than the crust of a loaf baked in the ordinary approved ovens.

It will also be seen that when the heat is turned off, such oven can be sufficiently cool in an hour's time to enable a workman or operative to get inside the same, without any great discomfort or inconvenience, inasmuch as the walls are light and there is no great amount of brick-work or masonry is to be heated as in the case of the ordinary ovens of different constructions, in which, in the case of making repairs or inspection, several days are required before the temperature can be brought low enough to permit a human being to get inside the baking chamber. Furthermore, such oven is economical in the use of fuel, as practical experience with the oven has proven that a given quantity of bread can be baked with about 65 per cent. of the fuel required for the ordinary ovens, which are built of brick and heavy material.

It will still further be obvious that in the use of my improved oven, great economy in labor and other expense of operating the same will be had by reason of loading and unloading the oven at the same end, which can be performed by one operator, if necessary, thereby enabling the employment of a minimum number of workmen who may be unskilled. Furthermore, by reason of the compact arrangement and fan action of the moving trays, which while subjecting several tiers of the loaves to the same source of heat, also provide a factor in fuel economy in that they prevent the formation of dead air spaces and hot spots in the oven. The movement of the trays in opposite directions through the baking chamber of the oven keeps the heated air in constant motion or circulation, thereby preventing any tendency toward air stagnation or heat stratification, and thus resulting in absolute uniformity of temperature in such chamber, which enables every loaf or article to be subjected to the same degree of heat. This is not possible in ovens that remain stationary during the baking process. The different size sheave wheels used for carrying the conveyer and trays act to make the oven more compact and enable the drawing of the chain belts closer together.

What I claim as my invention and desire to secure by Letters Patent is:

1. A baking apparatus, comprising a baking oven having a baking chamber within the same, conveyer means for moving articles while baking through said baking chamber in a circuitous up and down path, said means being adapted to introduce and discharge the articles to be baked at the same end of the said oven, and means within said chamber for allowing the articles to be baked entering said baking chamber to receive a moderate and gradual heat before receiving the normal heat of said chamber.

2. A baking apparatus, comprising a baking oven having a baking chamber within the same, conveyer means for moving articles while baking through said baking chamber in a circuitous up and down path, said means being adapted to introduce and discharge the articles to be baked at the same end of said oven, and baffle means within said chamber and adjacent the point of introduction for allowing the articles to be baked entering the said chamber to receive a moderate and gradual heat before receiving the normal heat of said chamber and to prevent the escape of heat from said oven.

3. A baking apparatus, comprising a baking oven having a baking chamber within the same, conveyer means having tiltable trays thereon for carrying the articles to be baked through said chamber in a circuitous up and down path, said means being adapted to introduce and discharge the articles to be baked at the same end of said oven, and a baffle wall within said baking chamber at the point of introduction and extending between the two first lines of trays in such chamber for allowing the articles to be baked entering said chamber to receive a moderate and gradual heat before receiving the normal heat of said chamber.

4. A baking apparatus, comprising a baking oven having a baking chamber within the same, said oven having an opening in the front wall for the entering of the articles into said chamber to be baked, conveyer means having tiltable trays thereon for carrying the articles to be baked through said chamber in a circuitous up and down path, said means being adapted to introduce and discharge the articles to be baked at the same end of said oven, and a baffle wall within said chamber extending upwardly from the point of introduction and between the two first lines of trays in such baking chamber for allowing the articles to be baked entering said chamber through said opening to receive a moderate and gradual heat before receiving the normal heat of said chamber and for preventing the escape of heat from said oven.

5. A baking apparatus comprising a baking chamber, a continuous carrier in said chamber which emerges from and reënters the chamber, a baffle wall adjacent the point of entrance and extending into the oven space along the path of travel of said carrier, said baffle tending to prevent the escape of heat from the oven chamber and providing a heating space within the oven chamber protected from the direct heat of the oven and of a temperature lower than the average temperature of the baking chamber.

6. A baking apparatus comprising a baking chamber, a continuous carrier in said chamber which emerges from and reënters the chamber at separate points on the same end of the chamber, a baffle wall adjacent the point of entrance and extending into the chamber along the path of travel of the carrier, said baffle tending to prevent the escape of heat from the oven and providing a heating space within the baking chamber of a temperature lower than the average temperature of the baking chamber.

7. A baking apparatus comprising a baking chamber, a continuous carrier in said chamber which emerges from and reënters the baking chamber, a baffle wall adjacent the point of entrance and extending upwardly into the said chamber along the path of travel of said carrier to form a space between the wall and the baffle through which the carrier passes, said baffle providing a heating space within the said chamber protected from the direct heat of the oven and of a temperature lower than the average temperature of the baking chamber and serving to prevent the escape of heat from the baking chamber.

8. A baking apparatus comprising a baking oven, an endless conveyer in said oven arranged to pass upwardly and downwardly throughout the greater portion of the length of the oven and to return in the oven above said upwardly and downwardly extending portions, said conveyer emerging at one end of the oven near the top thereof and returning into the oven at the same end near the bottom thereof whereby a vertically extending section of the conveyer is provided outside of the oven, means for heating the oven, and a wall adjacent the point of entrance and extending into the oven space along the path of travel of said conveyer, said wall tending to prevent the escape of heat from said oven and providing a heating space within the oven of a temperature lower than the average temperature of the oven.

In testimony whereof I, the said FREDERICK C. HALLER, have hereunto set my hand.

FREDERICK C. HALLER.

Witnesses:
J. N. COOKEY,
J. M. GEOGHEGAN.